(12) United States Patent
Kuo

(10) Patent No.: US 6,359,747 B1
(45) Date of Patent: Mar. 19, 2002

(54) HARD DISK PATTERNING

(75) Inventor: David S. Kuo, Castro Valley, CA (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 09/130,657

(22) Filed: Aug. 7, 1998

Related U.S. Application Data

(60) Provisional application No. 60/074,257, filed on Feb. 10, 1998.

(51) Int. Cl.[7] .............................................. G11B 21/02
(52) U.S. Cl. ............................ 360/75; 360/59; 369/13; 369/14
(58) Field of Search .......................... 360/75, 57, 55, 360/59, 66; 369/13, 14

(56) References Cited

U.S. PATENT DOCUMENTS

| | | | | |
|---|---|---|---|---|
| 3,176,278 A | * | 3/1965 | Mayer | 360/59 |
| 3,368,209 A | * | 2/1968 | McGlauchlin et al. | 360/59 |
| 3,512,170 A | * | 5/1970 | Nelson | 346/74.4 |
| 3,611,420 A | * | 10/1971 | Benoit | 346/74.4 |
| 3,612,759 A | * | 10/1971 | Nelson et al. | 386/42 |
| 4,466,004 A | * | 8/1984 | Kobayashi et al. | 346/74.4 |
| 4,935,835 A | | 6/1990 | Godwin et al. | 360/135 |
| 5,193,034 A | | 3/1993 | Tsuyoshi et al. | 360/51 |
| 5,262,907 A | | 11/1993 | Duffy et al. | 360/77.05 |
| 5,450,381 A | * | 9/1995 | Tsukamura et al. | 369/13 |
| 5,462,823 A | | 10/1995 | Evans et al. | 430/14 |
| 5,585,989 A | | 12/1996 | Kuromiya et al. | 360/135 |
| 5,619,480 A | | 4/1997 | Seo et al. | 369/14 |
| 5,629,909 A | * | 5/1997 | Shiratori | 369/13 |

* cited by examiner

Primary Examiner—David Hudspeth
Assistant Examiner—Dan I. Davidson
(74) Attorney, Agent, or Firm—James V. Mahon, Esq.; Clifford Chance Rogers & Wells LLP

(57) ABSTRACT

Disk formatting pattern methods and apparatus are disclosed. The methods feature forming a magnetic disk format information pattern on magnetic disk media by elevating the temperature of a pattern area and exposing the area to a magnetic field. The magnetic field has a field strength sufficient to alter magnetic properties of the elevated temperature region, but insufficient to substantially alter magnetic properties of disk regions at the disk's ambient temperature. A patterning system is also featured. The system includes a light source assembly, a pattern mask, and a magnetic field source. The light source assembly is arranged to project a light beam toward a surface of a magnetic disk. The pattern mask is arranged in the path of the light beam to produce a pattern image on the disk surface, and the magnetic field source produces a magnetic field at disk surface regions receiving the pattern image.

19 Claims, 5 Drawing Sheets

HARD DISK PATTERNING

Priority based on provisional patent application Ser. No. 60/074,257 filed Feb. 10, 1998 entitled "Photo Servo Patterning On Magnetic Hard Disk Media" is claimed.

BACKGROUND INFORMATION

Disk drives are information storage devices that use thin film magnetic media to store data. A hard disk drive includes one or more rotatable disk, each having closely spaced concentric data tracks. Each track is further subdivided into sectors wherein data is stored. As a disk rotates, a transducer (or "head") is positioned by an actuator to magnetically read data from or write data to the various sectors within the tracks on the disk.

Prior to a disk drive's use in a computer, formatting information is written to disk surfaces in the drive. This formatting information can include, for example, the location of each data storage sector, sector number identification information, the start of a group of sectors, and servo pattern information. Disk formatting information enables essential drive operations and/or provides for improved disk drive operation or features. For example, as described below, servo pattern information can be used to maintain a drive's magnetic head alignment.

To accurately read or write data to a disk, the drive's magnetic head must remain closely aligned with the particular track being accessed. If the head deviates from the track, data may be read or written improperly. This can result in irretrievable data and damage to existing stored data.

To maintain alignment between the head and track, a closed-loop alignment system is used. In conventional head alignment systems, magnetic markers on one or more disk surfaces are used to guide the heads. These markers, known as servo patterns, provide dynamic head position feedback to a head control mechanism. In response to detected servo pattern signals, the control mechanism can adjust head alignment while reading or writing data to the disk.

Magnetic servo patterns are typically written to a disk surface on a track-by-track basis during the final stages of disk drive assembly. A disk may have many thousands of tracks, consequently, "formatting" the disk with servo patterns and/or other formatting information can be a time-consuming process. Advantages in the manufacture of disk drives may be obtained by disk formatting methods allowing formatting information to be simultaneously created across an area of the disk surface. Such formatting methods may provide for an decrease in the total time required to format the disk.

SUMMARY

Magnetic disk formatting pattern are formed on disk surfaces during the manufacture of computer hard disk drives. Disk formatting systems may use a conventional magnetic read/write head to write formatting information to a spinning disk on a track-by-track and/or sector-by-sector basis. Such conventional systems may require a significant amount of time to complete the disk formatting process. According to the invention, advantages in the manufacture of disk drive media can be obtained by systems and methods allowing a region of a disk to simultaneously receive a magnetic disk formatting pattern. The disclosed systems and methods may allow many hundreds or thousands of bit or "dibit" positions to simultaneously receive disk formatting information. The transfer of the formatting information may be accomplished by raising the temperature of multiple bit or dibit positions on a disk surface pattern area using a projected image of the desired pattern and magnetically altering the properties of the raised temperature regions. Other features of implementations of the invention are described.

In general, in one aspect, the invention features a method of forming a pattern on magnetic disk media. The method includes elevating the temperature of a pattern area and exposing the area to a magnetic field. The magnetic field has a field strength sufficient to alter magnetic properties of the elevated temperature region, but insufficient to substantially alter magnetic properties of disk regions at the disk's ambient temperature.

Implementations of the invention may include one or more of the following features. The magnetic direction of disk surface particles may be altered by exposure to the magnetic field. The magnetic field may have a field strength greater than the coercivity of the media at the elevated temperature but less than the coercivity of the media at the media's ambient temperature. The magnetic disk may be rotated to a second position at which a second area of the disk is formatted.

Implementations may also include one or more of the following features. A substantially magnetically uniform disk surface may be established prior to exposing the pattern area to the magnetic field. The uniform disk surface may be established by exposing the magnetic disk surface to a conditioning field thereby causing disk surface particles to have a substantially uniform magnetic field strength and direction. Elevating the pattern area temperature may include projecting a pattern image on the disk surface. Projecting a pattern image may include directing a light beam through a pattern mask that has substantially opaque and substantially transparent regions or may include directing a modulated laser beam at the disk surface. An optical projection system may also be employed to project the pattern image.

In general, in another aspect, the invention features a magnetic disk patterning system. The system includes a light source assembly, a pattern mask, and a magnetic field source. The light source assembly is arranged to project a light beam toward a surface of a magnetic disk. The pattern mask is arranged in the path of the light beam to produce a pattern image on the disk surface, and the magnetic field source produces a magnetic field at disk surface regions receiving the pattern image.

Implementations of the invention may include one or more of the following features. The pattern image produced on the disk surface may elevate the temperature of the receiving disk surface. The magnetic field source may produce a magnetic field having a field strength greater than the coercivity of the media at the elevated temperature but less than the coercivity of the media at the disk's ambient temperature. The system may include control circuitry operative to regulate the strength and direction of the produced magnetic field. The light source assembly ma y include a modulated laser. The system may also include a motor assembly to alter the position of the magnetic disk surface with respect to the magnetic field.

In general, in another aspect, the invention features a magnetic disk patterning system. The system includes a magnetic field assembly for exposing a region of a magnetic disk to a magnetic field. The system also includes pattern production means to produce a pattern on the disk in the region exposed to the magnetic field.

In various implementations, the invention may provide an advantageous increase in disk formatting rate. Furthermore, improvements in formatting information positioning accuracy may be gained. Other advantages and features will become apparent from the following description and from the claims.

DETAILED DESCRIPTION

Figure 1:
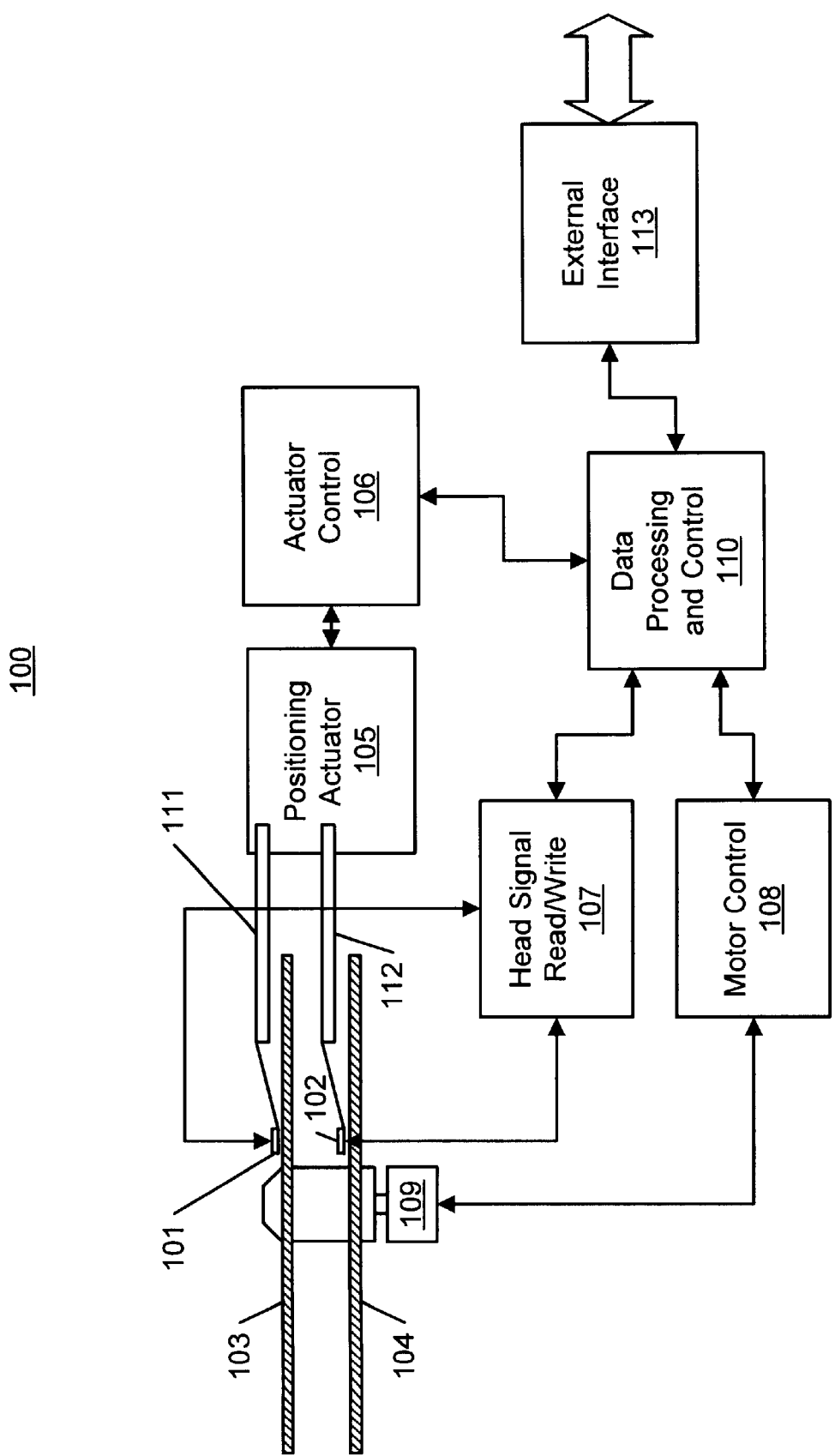
FIG. 1 is a hard disk drive, according to the invention.
Figure 2A:
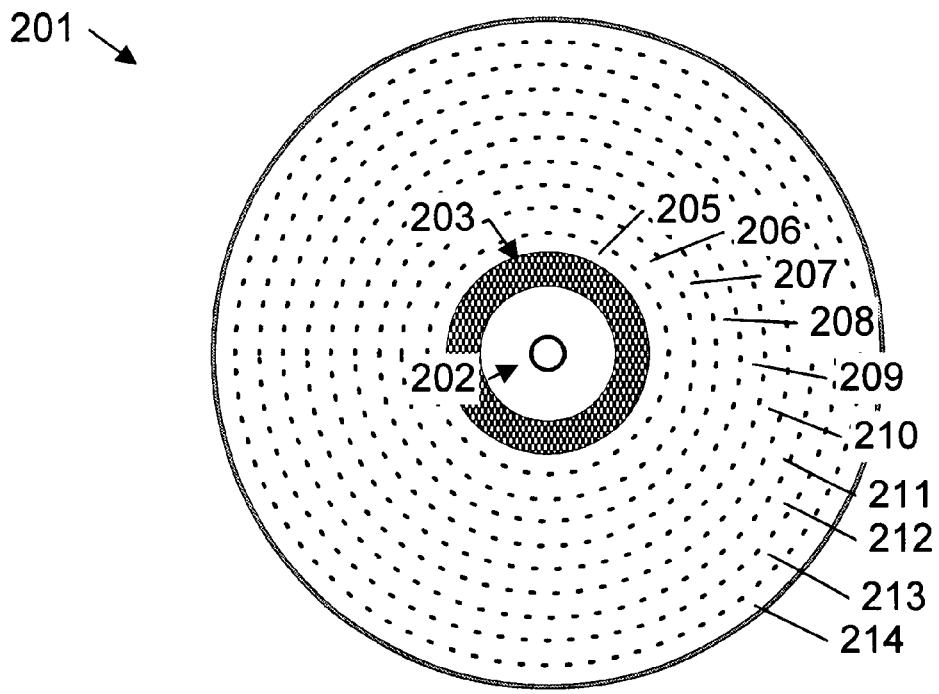
FIG. 2A is a top view of a disk surface.
Figure 2B:
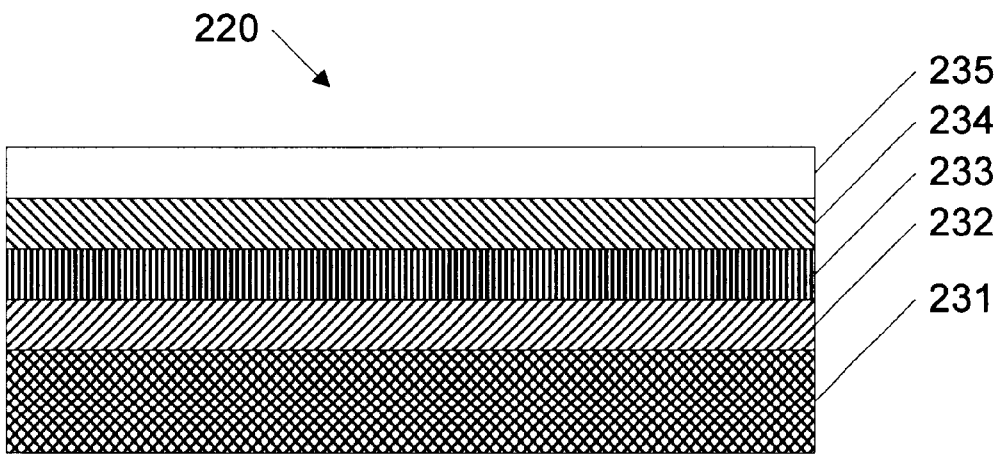
FIG. 2B is a side cross-sectional view of a disk.

FIG. 1 is an exemplary hard disk drive. The disk drive 100 includes two disks 103 and 104 that are rotated about a common axis by a motor 109. Each surface of disks 103 and 104 includes regions such as those of the exemplary disk surface 201 (FIG. 2A). As seen in FIG. 2A, a disk surface can include a head landing zone 203 where drive heads rest when the disk is at rest or below its operational rotation speed, a center region 202 where the disk can be attached to a drive motor spindle, and concentric tracks 205–214 where information is magnetically stored by drive heads. Disk surfaces may also include additional features and may include many hundreds or thousands of tracks. Referring back to FIG. 1, adjacent to the disks 103 and 104 is an electromechanical actuator 105 to which head support arms 111 and 112 are mounted. At the end of each support arm 111 and 112 is an electromagnetic transducer or "head" 101 and 102, respectively.

During operation of the disk drive 100, the actuator 105 positions disk heads 101 and 102 at select tracks on the disk 103 and 104. Positioning of heads 101 and 102 is controlled by actuator control circuitry 106. As the disk media 103 and 104 passes under drive heads 101 and 102, magnetically encoded signals can be read from or written to tracks on the disk media 103 and 104. Stored data can be extracted from the read signals, processed by circuitry 107 and 110, and sent to a host computer (not shown) using external interface 113. External interface 113 is, for example, a SCSI (small computer systems interface), an EIDE (enhanced integrated device electronics) interface, or a fibre channel interface to a host computer. Similarly, once properly positioned, heads 101 and 102 can write data to tracks on disk 103 and 104. The data to be written is received by the drive over interface 113. Additional signals may also be exchanged over interface 113, such as command and control information designating areas of disk 103 and 104 to be accessed during read and write operations.

Formatting information is stored on disk media 103 and 104 during the manufacture of the disk drive 100. During drive operation, the formatting information on media 103 and 104 facilitates, for example, read/write head 101 and 102 alignment and the location of disk surface sectors and tracks. In the description that follows, apparatus and methods to create and store magnetic information on disk surfaces are disclosed. For example purposes, the apparatus and methods are discussed with respect to the creation of servo pattern information on disk surfaces. It should be understood that the disclosed invention may be used to create a nd store other forms of magnetic information on disk surfaces.

To maintain head to track alignment, servo pattern signals are stored on media 103 and 104. These servo signals are read by the heads 101 and 102, detected by circuitry 107, and processed by control circuitry 1 10 to determine head 101 and 102 positioning accuracy. If the circuitry 1 10 determines that heads 101 and 102 are improperly positioned, it can send position correction commands to the actuator control 106. Additionally, in various implementations, servo pattern signals can be used by control circuitry 110 to determine disk 103 and 104 rotation speed. In such implementations, the control circuitry 110 can send speed control commands to circuitry 108 to adjust disk rotation speed.

Servo pattern signals are written to one or more surfaces of the disks 103 and 104 prior to the final assembly of the drive 100. Typically, a drive will use either embedded servo patterns or indirect servo patterns to enable head alignment. In an embedded pattern drive, servo patterns and stored data are co-located on each disk surface. In such systems, disk tracks are divided into multiple sectors. Each sector includes a servo pattern followed by a data storage area. Servo patterns are written prior to assembly and do not change during operation of the completed drive, while the sector's data area may be dynamically altered.

Alternatively, a drive may use an indirect servo pattern system. In an indirect servo pattern system, servo patterns are stored on disk servo surfaces while data originating from a host computer is stored on separate data surfaces. Typically, data surfaces and the servo surface include an equal number and arrangement of tracks. Thus, in an assembled drive, tracks on the servo surface and tracks on the data surface will be organized into cylinders each comprising a servo track and a number of data tracks that are substantially axially aligned with the servo track. Thus, alignment of disk heads in the data tracks can be effected by aligning to the servo track in the same cylinder and subsequently maintaining alignment with the servo track.

To create servo patterns in either an embedded pattern disk system or an indirect pattern disk system, a servo patterning device is used. In conventional patterning devices, servo patterns are written to a disk surface by rotating the disk under a magnetic patterning head. The patterning device includes disk rotation, patterning head, and head positioning mechanisms similar to those used in operational disk drives. As the disk is rotated beneath the patterning head, servo patterns are written to the disk on a track-by track basis.

Figure 3:
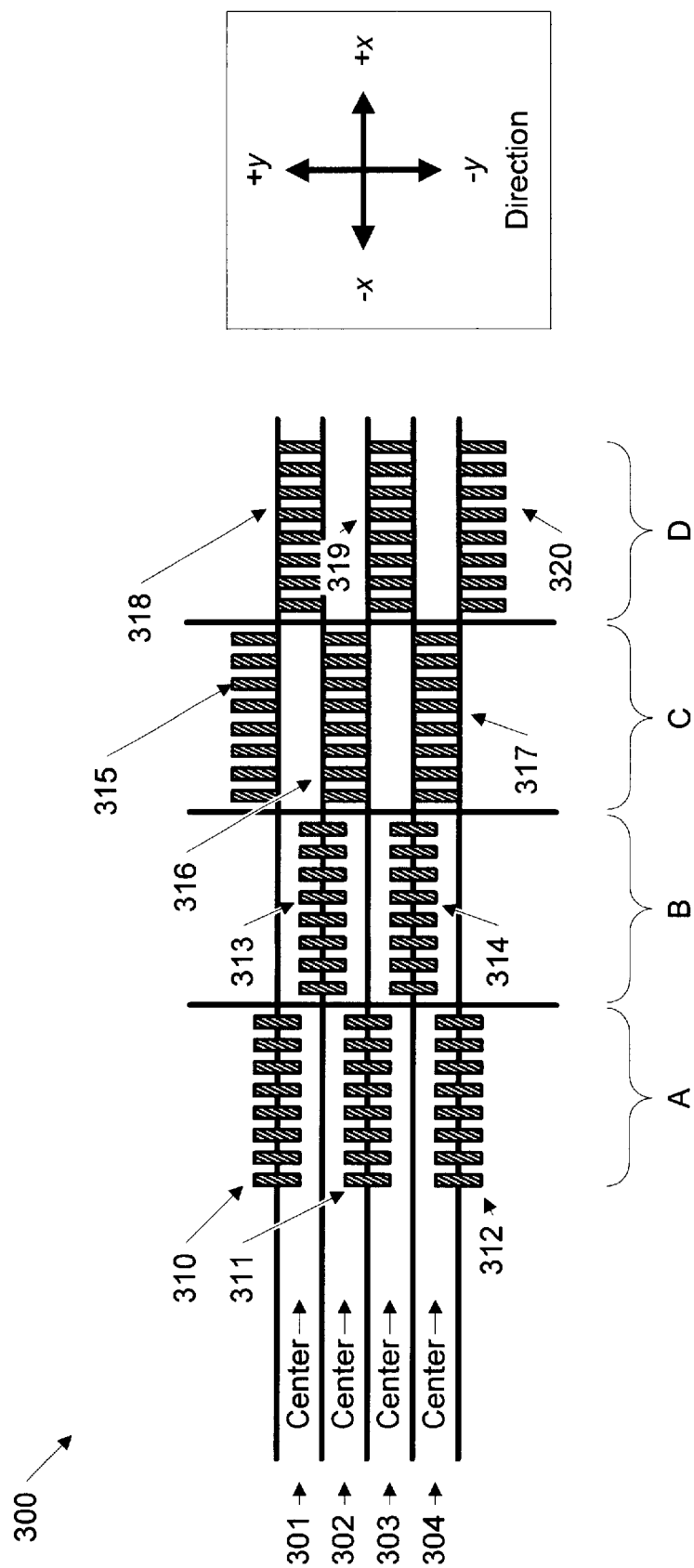
FIG. 3 depicts exemplary disk tracks and servo patterns.

Referring to FIG. 3, exemplary servo pattern markings 300 are shown. The servo patterns 300 consist of groups 310–320 of dibits in regions 'A', 'B', 'C', and 'D' of tracks 301–304. Each dibits is a pair of magnetic transitions that can be read by a disk head. As a disk head passes over the dibits in groups 310–320, the detected signal strength will be affected by the overlap between the disk head and the dibit group. For example, if the head is properly centered as it moves along track 301, it will encounter dibit group 310 in region 'A', group 313 in region 'B' no dibits in region 'C' and group 318 in region 'D.' As shown in FIG. 3, groups 310 and 313 partially overlap track 301 while group 318 is centered on track 301. Thus, a fully centered head will detect a lower signal strength as it passes over groups 310 and 313 compared to the signal strength as the head passes over group 318. Based on the dibit group signal strength detected in regions 'A', 'B', 'C', and 'D', the position of the drive head is determined. To do so, the following formulas may be used:

$$PES_1 = \frac{A-B}{A+B}$$

$$PES_2 = \frac{C-D}{C+D}$$

In the formulas $PES_1$ and $PES_2$, dibits signal strength detected in regions 'A', 'B', 'C', and 'D' is represented by the variables A, B, C, D, respectively. Head alignment and direction may then be determined by comparing $PES_1$ and $PES_2$. If the value of PES1 is zero, the disk head is aligned along a track center. If the values of $PES_1$ and $PES_2$ have the same sign, that is, both are positive or both are negative, then the head is displaced in the −y direction and should be moved in the +y direction to compensate. If the values of $PES_1$ and $PES_2$ have differing signs, then the head is displaced in the +y direction and should be moved in the −y direction to compensate. Additionally, the magnitudes of $PES_1$ and/or $PES_2$ may be used to determine the degree of head misalignment and, correspondingly, the head motion required to compensate. Additional information may also be derived from the dibit signals 310–320.

Figure 4A:
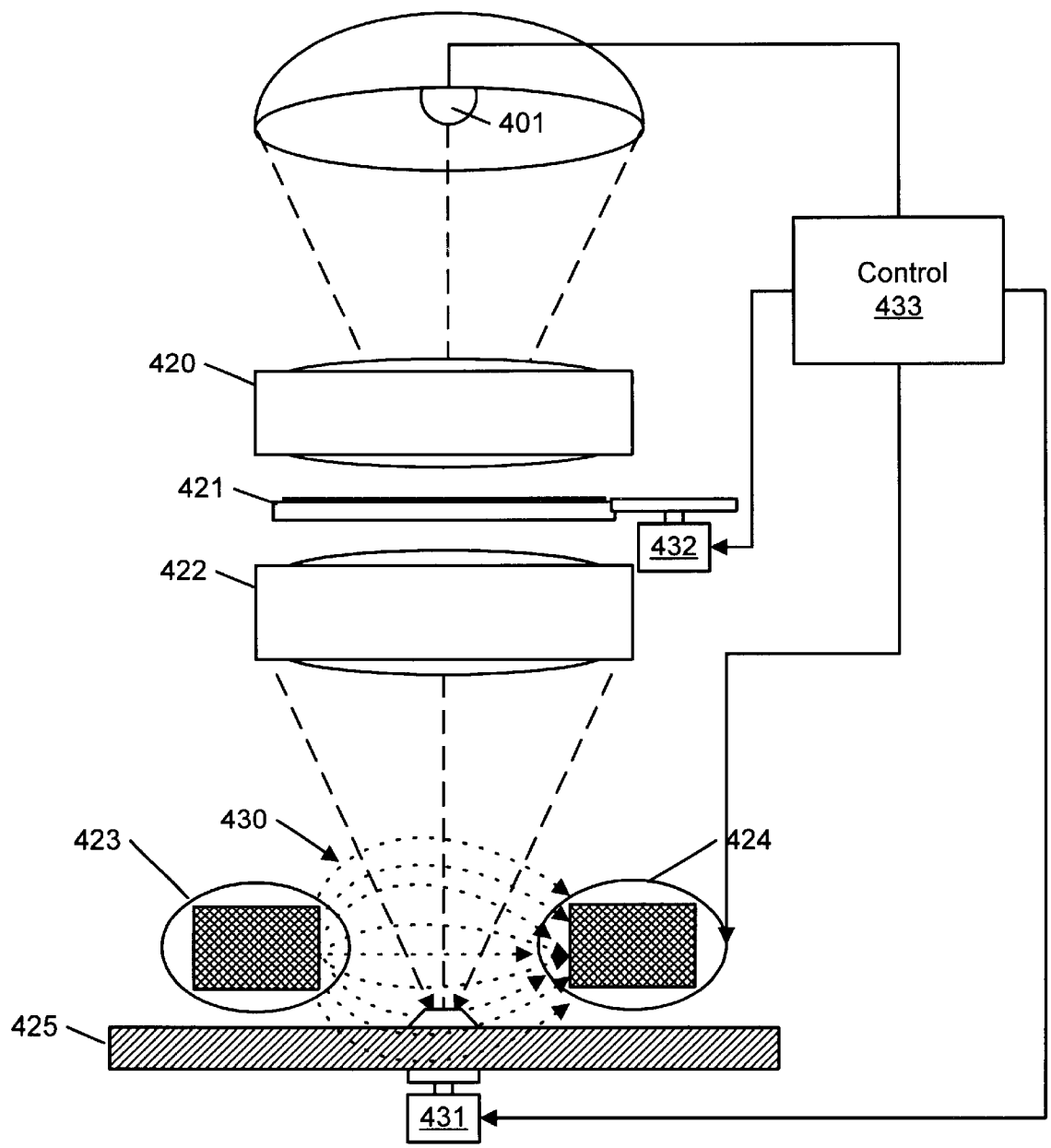
FIG. 4A is a servo pattern apparatus, according to the invention.

Referring to FIG. 4, to provide servo patterns on a magnetic disk, the disk formatting system 400 can be used. According to the invention, the system 400 allows multiple servo pattern dibits to be concurrently written and, in various implementations, allows servo patterns to be concurrently written to multiple disk tracks and/or sectors. Other disk formatting information, such as disk sector location and identification information may also be written to a disk surface using the formatting system 400 either concurrently with the servo pattern information or as a separate operation. To create formatting information on the disk surface 431, magnetic properties of the disk surface 431 are altered using energy from a light source 401. The energy from the light source 401 is directed by a focusing system 420 through a pattern mask 421 and onto the surface of a disk 425 by a projection lens 422. The mask 421 includes opaque regions that substantially block transmission of light energy from the source 401 while the transparent regions permit light energy to pass through the mask 421. The opaque and transparent regions of mask 421 form an image of a magnetic disk formatting pattern that can be projected on the surface of disk 425 by the lens 422. For example, the projected image may be an image of the servo pattern dibits or of servo pattern dibits and sector formatting information.

Figure 4B:
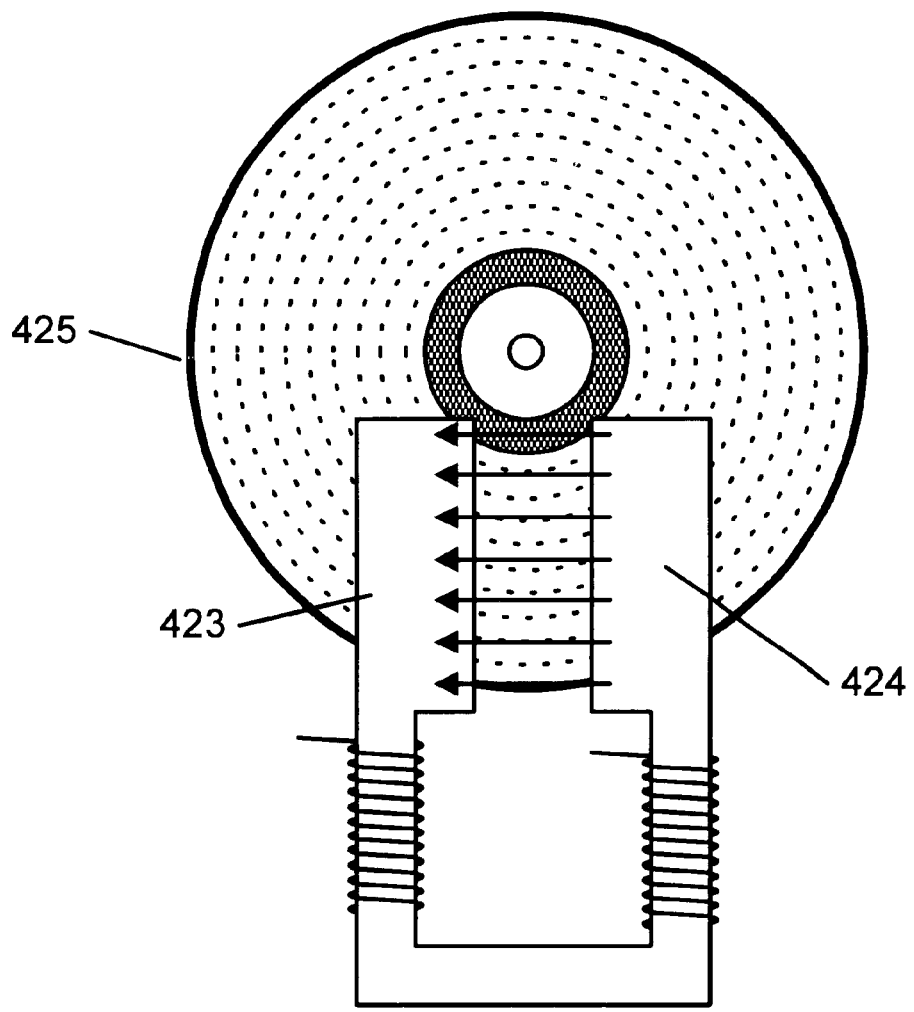
FIG. 4B is a partial view of a servo pattern apparatus, according to the invention.

To transfer a magnetic formatting pattern to the disk 425, a uniform magnetic direction and field strength on disk 425 is first established. To do so, a patterning control system 433 regulates the magnetic field between poles 423 and 424 of electromagnet 426 (FIG. 4B). Electromagnet 426 establishes a disk conditioning field 430 having a field strength Ψ. The field strength Ψ, which may be empirically determined, is greater than the ambient temperature (i.e., "room temperature") coercivity of the media 425. Alternatively, the field strength Ψ may be determined with the aid of a known formula, such as Flanders formula:

$$Hc(t, T) = Ha \left\{ 1 - \left[ \frac{kT}{KuV} \ln\left(\frac{f_0 t}{0.693}\right) \right]^{1/2} \right\}$$

where Hc is the coercivity of the magnetic media, Ha is the anisotropy field, k is Boltzmanns constant, T is the temperature in degrees Kelvin, t is the magnetic switching time, Ku is the first-order anisotropy constant and $f_0$ is a frequency constant of the order of $10^9$ Hz. The application of this formula is further described in *Journal of Applied Physics*, Vol. 62, No. 7, Oct. 1, 1987).

Once the requisite disk conditioning field of strength Ψ is established, the media 425 is rotated by motor 431 through the field 430. As the media 425 is rotated through the field 430, radial segments of the media are exposed to the field Ψ. The control system 433 regulates the rotation speed of motor 431 such that each portion of the media 425 to be conditioned is exposed to the field Ψ for a time period greater than the magnetic switching time of the magnetic media. The magnetic disk can be rotated in a continuous fashion while being exposed to the conditioning field, or the disk may be rotated in discrete steps until all portions of the media 425 to be conditioned are exposed to the field Ψ. The resulting exposure to the field Ψ causes the field and direction of magnetic particles in the surface of the disk 425 to be substantially uniform. The light source 401 may be off or attenuated during the media's exposure to the field Ψ. After the exposure to the field Ψ (and the resultant creation of substantially uniform magnetic media surface properties), the pattern represented on mask 421 is transferred to the disk surface.

To transfer the pattern from the mask 421 to the disk surface 425, the control system 433 aligns the disk and mask so that the formatting information represented on the mask can be projected onto the appropriate area of the disk. The control system 433 then activates the light source 401 to optically project the pattern image onto the disk 425 surface. Light energy passing through the mask 421 and projected onto the disk surface will cause the illuminated areas of the disk 425 to rise to an elevated temperature TH. The temperature TH may be regulated by the type of light source 401 used, the duration of the media's exposure, and the power output of the light source 401. While the exposed disk surface is at the temperature TH, a magnetic patterning field of strength Φ is applied to the disk surface by the electromagnet 426 (FIG. 4B). The strength of the patterning field Φ is greater than the coercivity of the media at the temperature TH, but lower than the media's coercivity at the ambient (room) temperature. Thus, disk surface areas at the elevated temperature TH will be substantially affected when exposed to the patterning field Φ. Additionally, the patterning field Φ has a field direction opposite that of the previously applied conditioning field Ψ. Thus, disk surface areas raised to the elevated temperature TH and exposed to the patterning field Φ will form magnetic transitions relative to the surrounding disk surface. Using this technique, magnetic patterns, such as servo pattern dibits 310–320 (FIG. 3) can be transferred to the disk surface.

After the pattern is magnetically formed on the exposed area of the disk 425, the control system 433 can reposition the media 425 to transfer formatting information to other areas of the disk surface. Additionally, mask 421 may be repositioned to, for example, alter the mask image projected onto the disk surface.

The type of mask 421 used in various implementations will depending on, among other things, the magnetic pattern feature sizes and the light source 401 used. For example, in a system 400 having a UV light source 401, the mask 421 can be UV-transparent glass with servo pattern features formed in a 2–4 micron thick coat of photographic emulsion. Such features may be made in the emulsion using standard photolithography techniques. Alternately, the mask may use a 1000–2000 angstrom coating of chromium or iron oxide on a UV-transparent glass. Other mask 421 and light sources 401 configurations can also be employed.

Additionally, the chosen light source 401 will depend on various factors such as the resolution desired and the need to avoid unintended changes in disk coating properties surface. In general, light sources having shorter wavelengths will provide better resolution. However, as the chosen wavelength becomes shorter, unintended damage to disk coatings may result. For example, while a mercury light source may provide desired resolution properties, it can increase risk of damage to the corrosion resistant carbon layer that may be applied to a disk. In such a case, a lower energy light source, such as a green Argon laser, may be more appropriate.

Furthermore, in various implementations, a contact printing arrangement can be used. In a contact printing arrangement, the mask 421 may be placed in direct contact with the disk surface thereby allowing the pattern image to be transferred to the surface without requiring an optical projection system. In still other embodiments, both the media 425 and mask 432 may be simultaneously rotated during the patterning process.

In various implementations, the light source 401 mask 425 and lenses 420,422 may be replaced by a directly controlled directable energy source such as a modulated laser.

Still other embodiments are within the scope of the following claims.

What is claimed is:

1. A method of forming a magnetic disk format pattern on a surface of a magnetic disk media to configure the disk media for digital data storage, the method comprising:
   simultaneously elevating multiple format signal positions of a format pattern area on the surface of the magnetic disk to a first temperature; and
   exposing the pattern area to a magnetic field having a field strength sufficient to alter magnetic properties of the multiple format signal positions at the first temperature but insufficient to substantially alter magnetic properties of disk surface that is at the disk's ambient temperature.

2. The method of claim 1 wherein the format signal positions comprise a collection of servo pattern dibit positions.

3. The method of claim 1 wherein:
   exposing comprises exposing for a switching time period $t_1$;
   the field strength is greater than the coercivity of the media at the first temperature when the media is exposed to the field for the switching time period $t_1$; and
   the field strength is less than the coercivity of the media at the media's ambient temperature when the media is exposed to the field for the switching time period $t_1$.

4. The method of claim 1 further comprising:
   prior to exposing the pattern area, establishing a substantially magnetically uniform disk surface.

5. The method of claim 4 wherein a substantially magnetically uniform disk surface comprises magnetic particles having a substantially uniform magnetic field strength and direction.

6. The method of claim 5 wherein exposing the pattern area alters the magnetic direction of the particles in the pattern area.

7. The method of claim 4 wherein establishing a substantially magnetically uniform disk surface comprises exposing the magnetic disk surface to a magnetic conditioning field for a conditioning time period $t_2$, the conditioning field having a field strength greater than the coercivity of the media during the conditioning time period $t_2$.

8. The method of claim 1 wherein elevating a pattern area comprises projecting a pattern image on the disk surface.

9. The method of claim 8 wherein projecting comprises directing a light beam from a light source through a pattern mask to form the pattern image, the pattern mask comprising regions that are substantially opaque and regions that are substantially transparent to the light beam.

10. The method of claim 8 wherein projecting comprises directing a laser beam at the disk surface and modulating the laser beam to form a pattern image on the disk surface.

11. The method of claim 9 wherein the pattern image is directed from the pattern mask to the disk surface using an optical projection system.

12. The method of claim 1 further comprising:
    moving the magnetic disk to a second position;
    elevating a second pattern area of the magnetic disk surface to the first temperature; and
    exposing the second pattern area to the magnetic field.

13. A method of forming a magnetic pattern on magnetic disk media, the method comprising:
    elevating a pattern area of a magnetic disk surface to a first temperature by directing a light beam from a light source through a pattern mask to form a pattern image, the pattern mask comprising regions that are substantially opaque and regions that are substantially transparent to the light beam; and
    exposing the pattern area to a magnetic field having a field strength sufficient to alter magnetic properties of disk surface regions at the first temperature but insufficient to substantially alter magnetic properties of the disk at the disk's ambient temperature; and
    moving the pattern mask to a second position and forming a second pattern image; and wherein the second pattern image comprises a pattern image formed by directing the light beam through the pattern mask in the second position.

14. A system for formatting a magnetic data storage disk to configure the storage disk for use in a digital data storage device, the system comprising
    a light source assembly for projecting a light beam toward a surface of a magnetic disk, the light beam having energy sufficient to raise disk surface regions receiving the light beam to a first temperature greater than the disk ambient temperature;
    a pattern mask arranged in the path of the light beam for producing a pattern image on the disk surface, the image comprising a plurality of separate disk format information positions; and
    a magnetic field source arranged to produce a magnetic field at the disk surface region receiving the pattern image, the magnetic field having a field strength sufficient to alter magnetic properties of the multiple format information positions at the first temperature but insufficient to substantially alter magnetic properties of disk positions at the disk's ambient temperature.

15. The system of claim 14 wherein:
    the pattern image produced on the disk surface elevates the temperature of the receiving disk surface to a temperature $t_1$ greater than the disk's ambient temperature; and
    the magnetic field source produces a magnetic field having a field strength greater than the coercivity of the media at the temperature ti and less than the coercivity of the media at the disk's ambient temperature.

16. The system of claim 14 further comprising control circuitry operative to regulate the strength and direction of the magnetic field produced by the magnetic field source.

17. The system of claim 14 further comprising a motor assembly to alter the position of the magnetic disk surface with respect to the magnetic field.

18. The system of claim 14 wherein the pattern mask comprises regions that are substantially opaque and regions that are substantially transparent to the light beam.

19. A system for formatting magnetic media for information storage, the system comprising:

a magnetic field assembly for exposing a region of a magnetic disk to a magnetic field; and pattern production means operative to simultaneously produce a disk format pattern comprising multiple format signal positions on the disk in the region exposed to the magnetic field.

* * * * *